United States Patent [19]
Wakatsuki et al.

[11] Patent Number: 4,910,753
[45] Date of Patent: Mar. 20, 1990

[54] FSK DEMODULATING DEVICE

[75] Inventors: Yoshio Wakatsuki; Hajime Takeuchi; Giichiro Shimizu, all of Tokyo, Japan

[73] Assignee: Man Design Co., Ltd., Japan

[21] Appl. No.: 234,756

[22] Filed: Aug. 22, 1988

[30] Foreign Application Priority Data

Sep. 9, 1987 [JP] Japan ................................ 62-225526

[51] Int. Cl.$^4$ ............................................. H04L 27/14
[52] U.S. Cl. ........................................ 375/76; 375/88; 307/358
[58] Field of Search ...................... 375/88, 99, 45, 51, 375/104, 76, 80, 91, 111, 94, 116, 117; 307/358; 329/110, 300, 315

[56] References Cited

U.S. PATENT DOCUMENTS

| | | | |
|---|---|---|---|
| 3,509,279 | 4/1970 | Martin et al. | 375/76 |
| 3,688,205 | 8/1972 | Burger | 375/76 |
| 4,263,520 | 4/1981 | Kajihata et al. | 307/358 |
| 4,596,022 | 6/1986 | Stoner | 375/88 |

Primary Examiner—Benedict V. Safourek
Assistant Examiner—Marianne Huseman
Attorney, Agent, or Firm—Nixon & Vanderhye

[57] ABSTRACT

An FSK shift keying device includes a detector for detecting a transmission frame consisting of a preamble, data, and a postamble, a time constant circuit charged in response to a voltage signal detected by the detector for generating a time constant, a charging voltage being determined in accordance with the time constant set in correspondence with a duration of high level in the preamble of the transmission frame, a reference voltage generator for generating a reference voltage signal having an amplitude value which is ½ an amplitude value of the voltage signal from the detector, and further generating a comparison reference voltage signal obtained by subtracting the reference voltage from the charging voltage, and a comparator for comparing the comparison reference voltage signal with the voltage signal input from the detector.

4 Claims, 5 Drawing Sheets

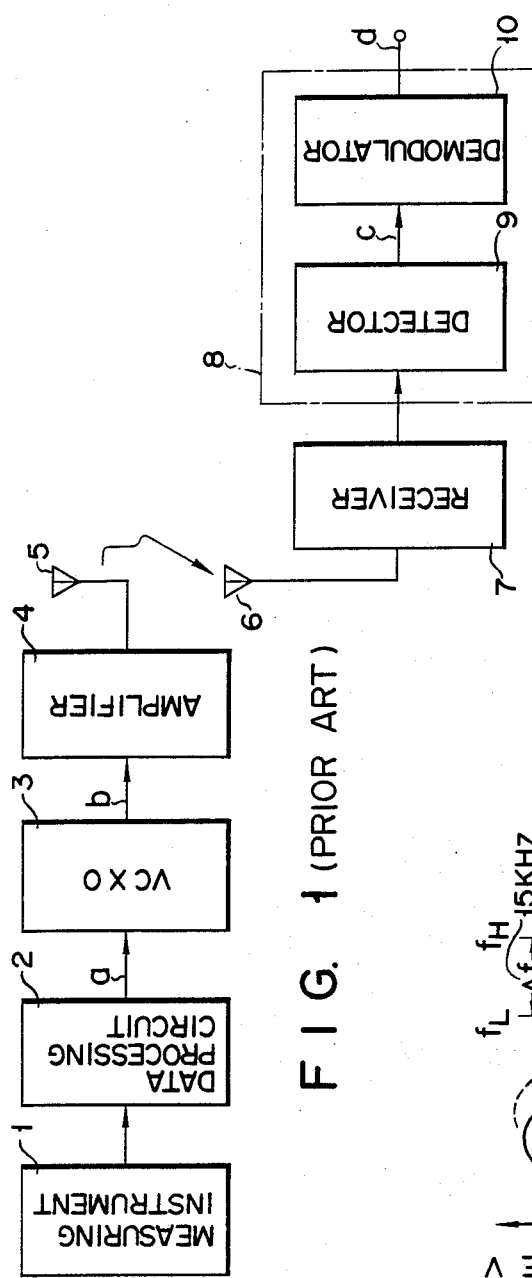
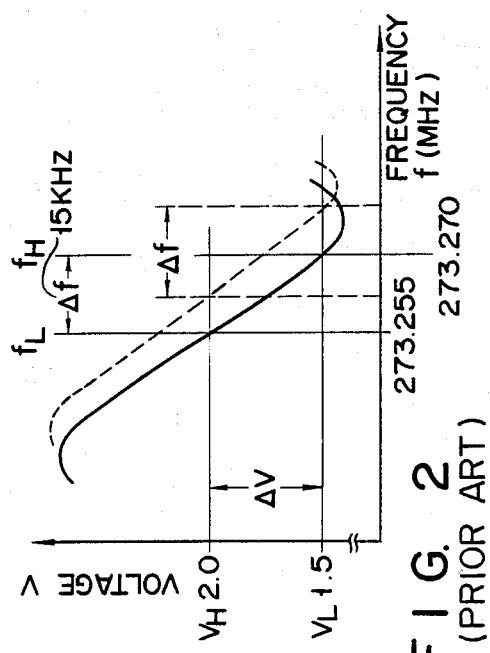
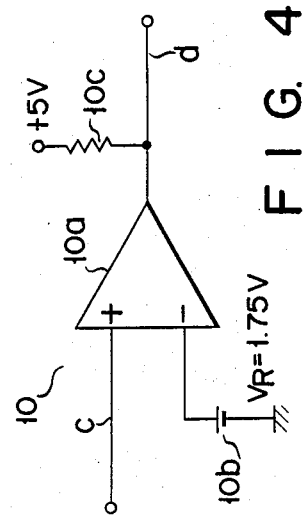
FIG. 1 (PRIOR ART)
FIG. 2 (PRIOR ART)
FIG. 4

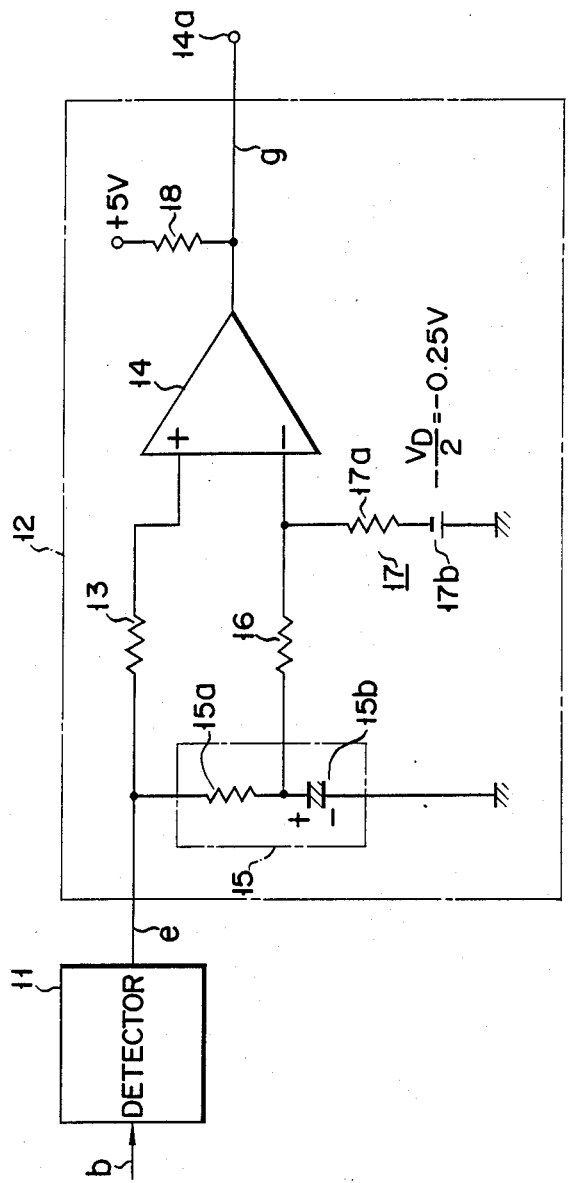
F I G. 6

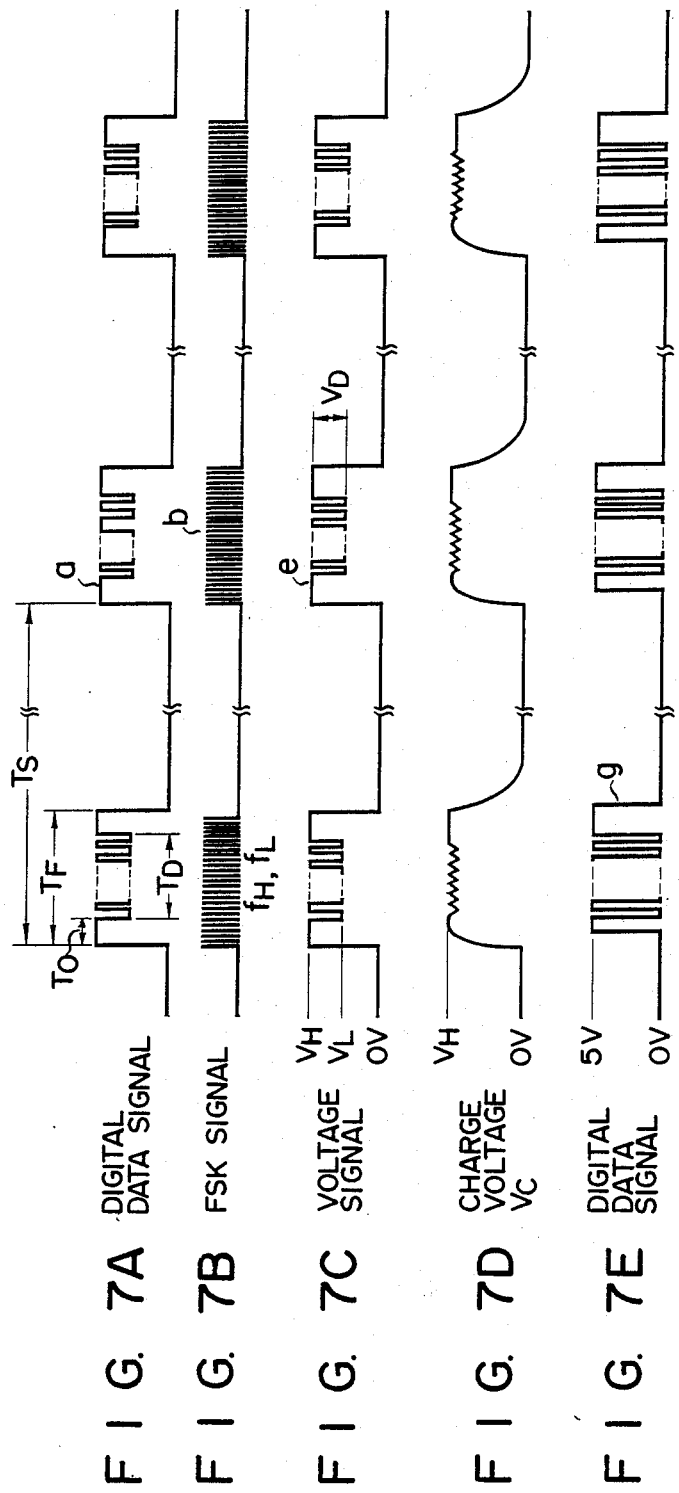

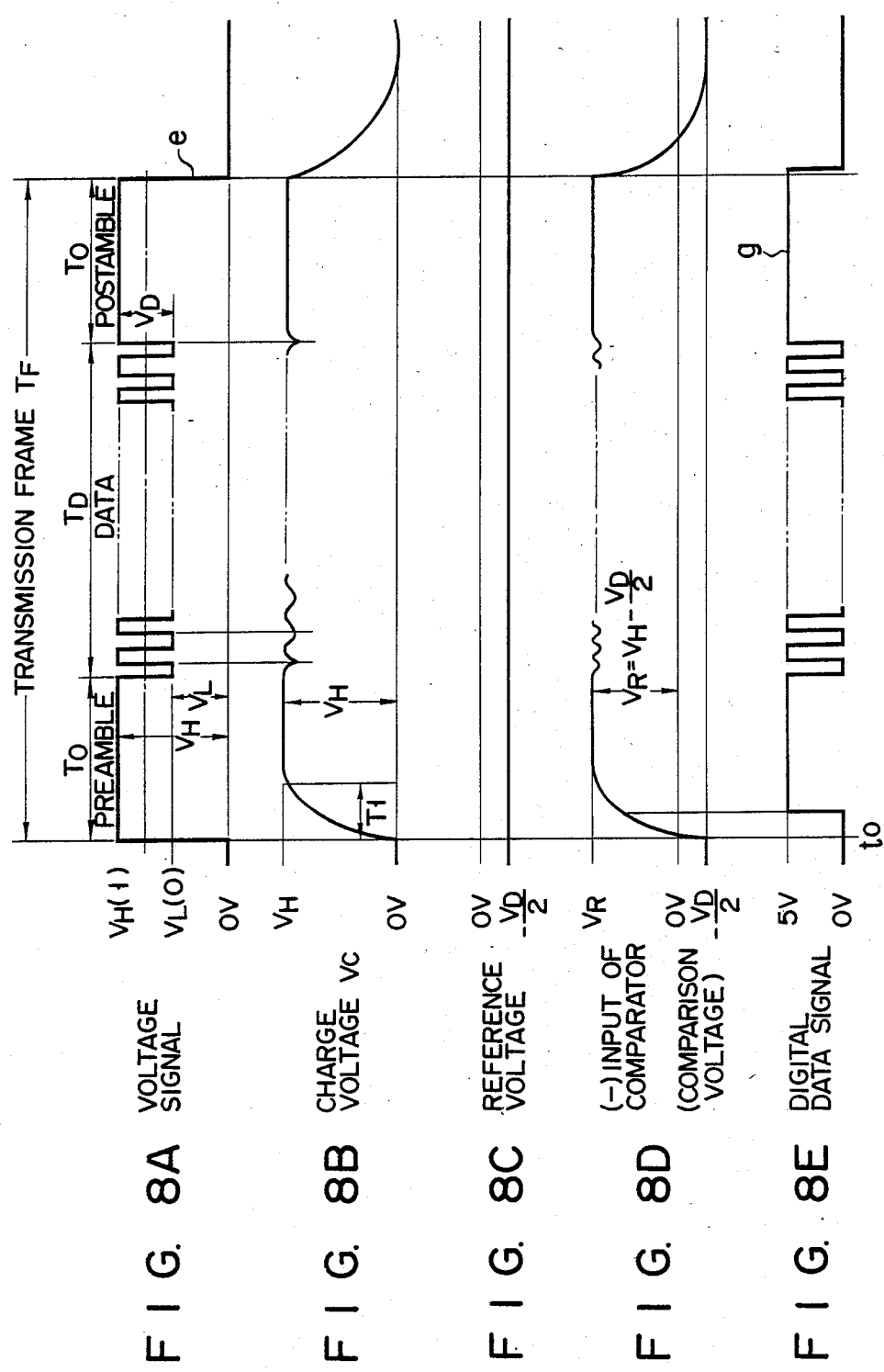

FSK DEMODULATING DEVICE

BACKGROUND OF THE INVENTION

1. Field of the Invention

The present invention relates to an FSK demodulating device located at a receiving side in a data transmission system in which digital data is formatted in a transmission frame to transmit the digital data as a frequency shift keying (FSK) signal, for demodulating the received frequency shift keying (FSK) signal to an original digital data signal.

2. Description of the Related Art

A data transmission system in which digital data is formatted in a transmission frame to transmit the digital data as a frequency shift keying (FSK) signal has been practically used as a means for accurately transmitting the digital data through a data communication channel or a radio channel for a long distance. FIG. 1 is a block diagram showing e.g., a data transmission system for transmitting data obtained by a measuring instrument to a host device through a radio channel.

The data measured by measuring instrument 1 is converted into e.g., 8-bit digital data by data processing circuit 2. The 8-bit digital data is formatted in a serial transmission frame and applied to voltage-controlled oscillator (VCXO) 3 as digital data signal a. Digital data signal a is modulated to frequency shift keying (FSK) signal b by voltage-controlled oscillator 3. Modulated signal b is amplified by amplifier 4 and output through a radio channel via antenna 5.

Frequency shift keying signal b output through the radio channel from antenna 5 is received by antenna 6 at a receiving side. Received signal b is amplified by amplifier 7 and unnecessary frequency components thereof are removed. Then, signal b is input to FSK demodulating device 8. Frequency shift keying signal b input to FSK demodulating device 8 is converted into voltage signal c by detector 9 and discriminated to the original digital data signal d by discriminator 10.

Voltage-controlled oscillator 3 described above serves as e.g., an oscillator in which quartz is used as an oscillating element. As shown in FIG. 2, oscillation frequency f of oscillator 3 is changed in proportion to input voltage value V. As shown in FIG. 3A, assume that when digital data signal a is at H level, its signal value is e.g., 2.0 V, and when signal a is at L level, its signal value is e.g., 1.5 V. When digital data signal a is kept at H level (V=VH), signal a serves as an output signal having frequency fH (=273.270 MHz). When digital data signal a is kept at L level, signal a serves as an output signal having frequency fL (=273.252 MHz). More specifically, frequency shift keying (FSK) signal b output from voltage-controlled oscillator 3 serves a combination signal consisting of frequencies fH and fL, which are respectively output in response to the H and L signal levels.

Detector 9 at a receiving side converts frequency shift keying signal b received by receiver 7 into voltage values VH (=2.0 V) and VL (=1.5 V) in correspondence with frequencies fH and fL of signal b and outputs voltage signal c, as shown in FIG. 3C.

As shown in FIG. 4, discriminator 10 includes voltage comparator 10a and pull-up resistor 10c. In voltage comparator 10a, voltage signal c is input to a (+) input terminal thereof, and e.g., reference voltage VR of 1.75 V from battery 10b is applied to a (−) terminal thereof. Pull-up resistor 10c is arranged to apply a control voltage of +5 V to an output terminal of voltage comparator 10a. Therefore, input voltage signal c is compared with reference voltage VR (=1.75 V), and digital data signal d (Vh=5 V, and Vl=0 V) is output from the output terminal, as shown in FIG. 3D.

The FSK demodulating device with the above arrangement, however, has the following problems. More specifically, a conventional FSK signal has two transmission methods. One of them is called subcarrier FSK or audio FSK. In this method, FM modulation of binary signal is performed with two audio frequencies. The other method is called direct FSK. In this method, as shown in FIGS. 1 and 2, a carrier itself is shifted to modulate the binary signal.

The direct FSK has the following advantages as compared to the subcarrier FSK or the audio FSK. That is, in the direct FSK, a higher transmission speed and a simple modulating device can be realized at low manufacturing cost. However, the direct FSK has the following disadvantage in its demodulator. More specifically, according to the conventional method a signal modulated with the direct FSK is demodulated to the voltage corresponding to the binary value through an FM demodulating device. At this time, if the frequency of the carrier is changed in accordance with the change in factors such as temperature, voltage, and the like, which affect the frequency, the voltage which is FM-demodulated is also changed. Therefore, the voltage comparator cannot accurately compare the voltages. The above arrangement will be described below in detail with reference to the accompanying circuit diagrams.

Voltage-controlled oscillator 3 at a transmitting side as described above has a quartz oscillating element. Therefore, as shown in FIG. 2, output frequency change Δf (=fH−fL) with respect to input voltage change ΔV (=VH−VL) is hardly changed and a predetermined value is constantly maintained. For example, Δf=15 kHz at ΔV=0.5 V, according to the arrangement in FIG. 2.

If an ambient temperature is changed, however, entire voltage frequency characteristics are shifted, as represented by a dotted line in FIG. 2. In other words, the characteristics are zero-point shifted in an axis direction of frequency f. Thus, if the voltage frequency characteristics are zero-point shifted, frequency values fH and fL of frequency shift keying signal b are equally increased from the corresponding reference values (273.270 MHz, 273.255 MHz).

Detector 9 in FSK demodulating device 8 at the receiving side, which has received frequency shift keying signal b including above frequencies fH and fL, detects frequencies fH and fL which are equally increased. Therefore, as shown in FIG. 5, voltages VH and VL of voltage signal b' output from detector 9 have signal waveforms zero-point shifted upward by dV as compared to voltages VH and VL of voltage signal b in a normal mode.

When voltage signal b' zero-point shifted by dV is applied to the (+) terminal of voltage comparator 10a in discriminator 10, since the value of reference voltage VR applied to the (−) terminal is not changed, reference voltage VR and voltage VL of voltage signal b' become similar to each other. Therefore, if some noise or the like is mixed in voltage signal b', discriminator 10 may be erroneously operated. In addition, when zero-point shift amount dV described above becomes larger than reference voltage VR, this discriminator 10 cannot undesirably discriminate voltage signal b′0 to the original data signal d.

It should be noted that even if the above-described voltage frequency characteristics are zero-point shifted in a (−) direction, or digital data signal a input to voltage-controlled oscillator 3 is largely zero-point shifted, oscillation frequencies fH and fL of voltage-controlled oscillator 3 are shifted to pose the above problems.

SUMMARY OF THE INVENTION

It is an object of the present invention to provide an FSK demodulating device which can always demodulate an accurate digital data signal from a frequency shift keying signal even if a detected voltage signal is largely zero-point shifted, and can greatly improve reliability of the device.

A direct frequency shift keying (FSK) demodulating apparatus in a transmission system for formatting digital data into a transmission frame including at least a preamble data indicating at least a start of data to be transmitted, and data to be transmitted, and for transmitting the transmission frame as a frequency keying signal, said apparatus comprising detecting means for detecting the input frequency shift keying signal (FSK) signal to convert the detected signal into a voltage signal corresponding to each of carrier frequency values, and demodulating means coupled to said detecting means for demodulating the voltage signal output from said detecting means to an original digital data signal representing said transmission frame, said demodulating means including time constant circuit means, coupled to said detecting means, having a time constant corresponding to a duration of one level in the preamble of the transmission frame, for charging in response to the voltage signal from said detecting means within a significant data, and for charging in response to the voltage signal from said detecting means within a period in which the preamble data represents a significant data, and for discharging the charged voltage in accordance with the time constant which determines a time interval required for increasing a charging voltage to a signal value of the voltage signal, reference voltage generating means, coupled to said time constant circuit means, for generating a reference voltage which is a fraction of a predetermined value of an amplitude value of the voltage signal, and generating a difference voltage between the reference voltage and the charging voltage from said time constant circuit means as a comparison reference signal, and comparing means coupled to said detecting means, time constant circuit means, and reference voltage generating means, for comparing the voltage signal input from said detecting means with the comparison reference voltage value output from said reference voltage generating means to detect the level of the voltage signal input from said detecting means.

According to the FSK demodulating device of the present invention, the voltage signal output from the detector is input to the voltage comparator and the time constant circuit. The time constant circuit is charged in response to the voltage signal up to a signal value of the voltage signal. In general, "1" (H level) state which is a predetermined or longer duration continues in the preamble set at a leading portion of the transmission frame. Note that a time interval required for increasing the charging voltage in the time constant circuit to the signal value of the voltage signal is determined in accordance with the time constant set in correspondence with the duration of "1" (H level) in the preamble. Therefore, the charging voltage of the time constant circuit is increased to signal value VH corresponding to the H level of the voltage signal during the duration of the H level after the preamble is started. However, when the charging voltage is increased to signal value VH, the voltage signal reaches the data portion after the preamble. Therefore, even if the voltage signal is often changed to signal values VH or VL in response to the data value since a value of the time constant is set in correspondence with the duration of "1" (H level) in the preamble, the charging voltage is hardly changed and the voltage variations can be ignored.

On the other hand, even if zero-point shift occurs, amplitude value VD represented by a difference between voltages VH and VL of the voltage signal is kept substantially constant. Therefore, if a difference voltage obtained by subtracting the reference voltage of the ½ amplitude value from the charging voltage of the time constant circuit is applied as a comparison voltage in a case where the voltage signal is demodulated to the digital data signal, the comparison voltage is changed in response to the zero-point shift of the voltage signal. Therefore, the comparison voltage value does not come close to voltage value VH or VL of the voltage signal. Therefore, an accurate digital data signal can be obtained from the output terminal of the voltage comparator.

Therefore, reliability of the FSK demodulating device can be greatly improved without largely increasing manufacturing cost.

BRIEF DESCRIPTION OF THE DRAWINGS

Other objects and features of the present invention will be apparent from the following description taken in connection with the accompanying drawings, in which:

FIG. 1 is a block diagram showing a conventional data transmission system;

FIG. 2 is a graph showing voltage frequency characteristics of a conventional voltage-controlled oscillator;

FIGS. 3A through 3D are timing charts of signals used in the data transmission system shown in FIG. 1, in which FIG. 3A is a timing chart of digital data signal a, FIG. 3B is a timing chart of an FSK signal, FIG. 3C is a timing chart of voltage signal c, and FIG. 3D is a timing chart of digital data signal d;

FIG. 4 is a circuit diagram of a demodulator shown in FIG. 1;

FIG. 6 is a block diagram showing an embodiment of an FSK demodulating device according to the present invention;

FIG. 7A through 7E are timing charts of the signals used in the FSK demodulating device according to the present invention shown in FIG. 6, in which FIG. 7A shows digital data signal a supplied to the voltage-controlled oscillator, FIG. 7B shows a frequency shift keying signal output from an antenna through a radio channel, FIG. 7C shows a voltage signal detected by the detector, FIG. 7D shows a charging voltage of a capacitor, and FIG. 7E shows a digital data signal representing a comparison result of the comparator; and FIGS. 8A through 8E are timing charts of the signals used in the FSK demodulating device according to the present invention shown in FIG. 6, in which FIG. 8A shows voltage signal e output from the detector, FIG. 8B shows a charging voltage of the capacitor, FIG. 8C shows a reference voltage signal generated by a reference voltage generator, FIG. 8D shows a voltage signal to be input to the comparator, and FIG. 8E shows digital data signal g representing a comparison result of the comparator.

DETAILED DESCRIPTION OF THE PREFERRED EMBODIMENTS

Figure 5:
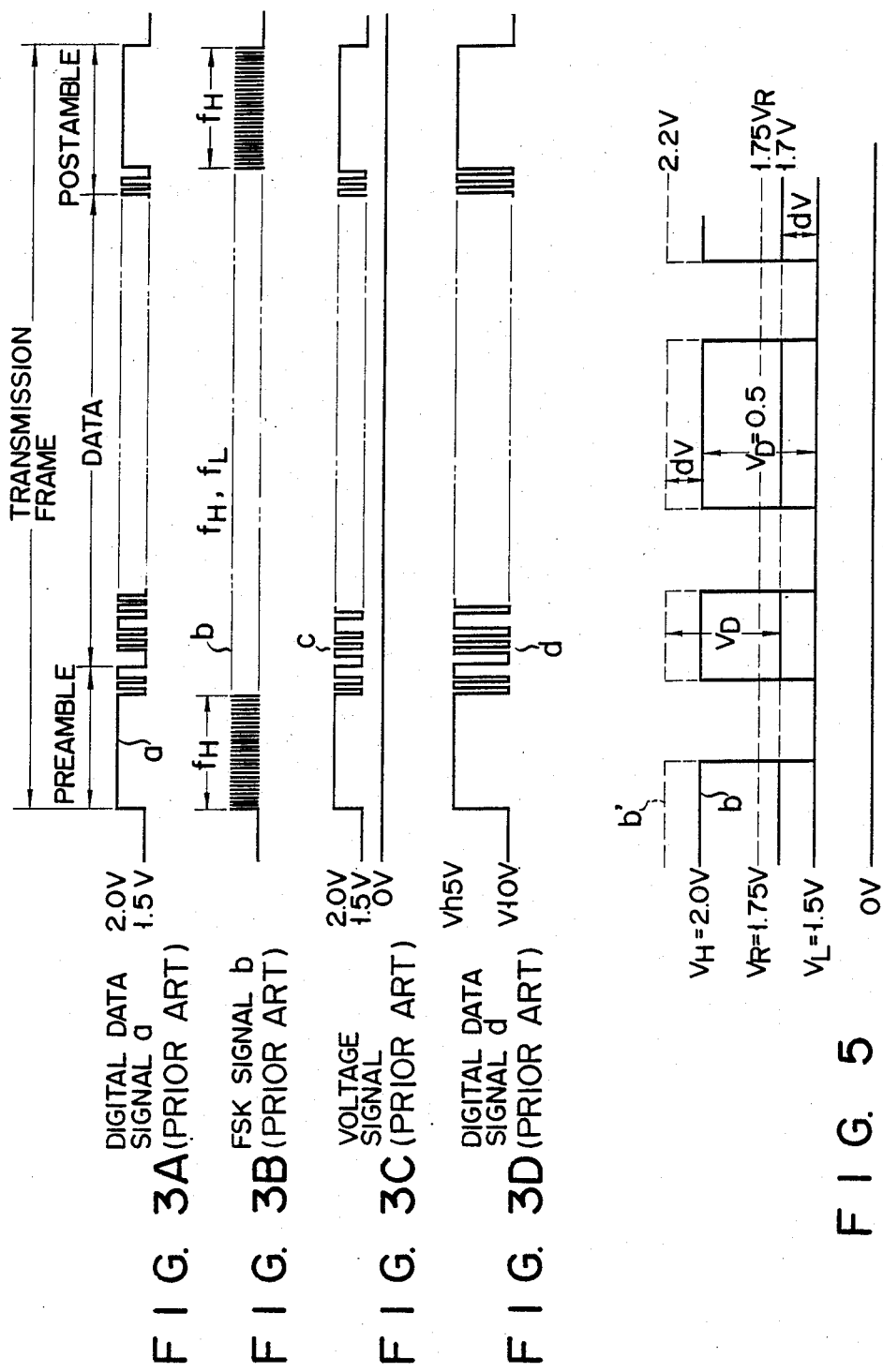
FIG. 5 is a chart of a waveform of voltage signal b′ output from a detector shown in FIG. 1.

FIG. 6 is a block diagram showing an FSK demodulating device according to an embodiment of the present invention. The same reference numeral in FIG. 6 denote the same parts as in FIG. 1. More specifically, frequency shift keying (FSK) signal b received by receiver 7 through antenna 6 is converted into voltage signal e by detector 11, and voltage signal e is input to discriminator 12. Voltage signal e input to discriminator 12 is input to a (+) input terminal of voltage comparator 14 through resistor 13, and also input to time constant circuit 15 including a series circuit having resistor 15a and capacitor 15b. A terminal voltage of capacitor 15b in time constant circuit 15, i.e., charging voltage Vc is input to a (−) input terminal of voltage comparator 14 through resistor 16. Reference voltage VD/2 which is ½ amplitude value VD (=VH−VL) of voltage signal e is reverse-biased to the (−) input terminal from reference voltage circuit 17 (−VD/2 = −0.25 V). Reference voltage circuit 17 includes resistor 17a and battery 17b having polarities shown in FIG. 6. More specifically, comparison voltage VR (Vc−VD/2) obtained by subtracting reference voltage (VD/2) of reference voltage circuit 17 from charging voltage Vc of time constant circuit 15 is input to the (−) input terminal of voltage comparator 14. A control voltage of +5 V is applied to output terminal 14a of comparator 14 through pull-up resistor 18.

Time constant circuit 15 described above is charged in response to voltage signal e output from detector 11 as shown in FIG. 8A. However, predetermined time interval T1 required for increasing charging voltage Vc to a value substantially equal to signal value VH corresponding to the H level of voltage signal e from a start of charging is determined in accordance with a time constant which can be calculated using a resistance of resistor 15a and a capacitance of capacitor 15b. This time constant is set to be e.g., about ⅓ duration T0 (several tens ms to a value between 100 and 200 ms) of level "1" (H level) in the preamble including predetermined time interval T1 assigned to the start portion of the transmission frame (T1=0.33 T0). Therefore, when voltage signal e is not input, capacitor 15b is discharged at a rate corresponding to the time constant, and charging voltage Vc returns to an initial state (0 V) after a given time interval.

An operation of the FSK demodulating device having the above arrangement will be described below with reference to timing charts in FIGS. 7A through 7E and FIGS. 8A through 8E. Referring to the time charts in FIGS. 7A through 7H, digital data signal a input to voltage-controlled oscillator 3 from data processing circuit 2 at a transmitting side includes the transmission frame (frame length TF) including the preamble (duration T0 of H level), the data (data duration TD), and the postamble (duration TD of H level), at constant transmission period TS. Note that, in this embodiment, the duration (frame length) TF of a given transmission frame is set to be about 0.1 sec., and transmission period TS is set to be about 1.0 sec.

Digital data signal a is modulated to frequency shift keying (FSK) signal b including a combination frequency of frequencies fH and fL as shown in FIG. 7B by voltage-controlled oscillator 3, and output through radio waves via amplifier 4 and antenna 5. Frequency shift keying signal b is received at a receiving side and converted into voltage signal e, the signal value of which is changed to VH or VL in correspondence with the respective frequency values fH and fL, by detector 11 in the FSK demodulating device. Amplitude value VD of voltage signal e is determined in accordance with a gradient of the voltage/frequency characteristic curve of voltage controlled oscillator 3 at the transmitting side as described above, and is substantially constant. Amplitude value VD in this embodiment is set at 0.5 V.

As shown in the time chart in FIG. 8A, when voltage signal e is enabled at the start position of the preamble at time t0, capacitor 15b in time constant circuit 15 is started to be charged, as shown in FIG. 8B. When predetermined time interval T1 determined in accordance with the time constant as described above has elapsed, charging voltage Vc reaches signal value VH substantially corresponding to the H level of voltage signal e. Note that, when charging voltage Vc reaches signal value VH, even if voltage signal e is often changed to signal value VH or VL, the value of charging voltage Vc is not greatly smaller than signal value VH. Therefore, time constant circuit 15 outputs charging voltage Vc equal to signal value VH during a time interval when predetermined time interval T1 has elapsed until the transmission frame is completed.

As shown in FIG. 8C, since the reference voltage of −VD/2 is also applied to the (−) input terminal of voltage comparator 14, comparison voltage VR applied to this (−) input terminal is given as (VH−VD/2), as shown in FIG. 8D. Therefore, after this, voltage signal e is compared with comparison voltage VR. The comparison result is output from output terminal 14a as digital data signal g shown in FIG. 8E. Note that since a control voltage of 5 V is applied to output terminal 14a through pull-up resistor 18, the voltage value of digital data signal g of H level is set to be 5 V.

According to the FSK demodulating device having the above arrangement, comparison voltage VR applied to the (−) input terminal of voltage comparator 14 has an intermediate voltage value, i.e., (VH−VD/2)=(VH−VL)/2, between signal values VH and VL respectively corresponding to H and L levels of voltage signal e. Therefore, even if voltage signal e is zero-point shifted and signal values VH and VL are largely shifted, signal values VH and VL are certainly discriminated in voltage comparator 14.

As a result, even if the voltage frequency characteristics of voltage-controlled oscillator 3 shown in FIG. 2 or digital data signal a transmitted from data processing circuit 2 is largely zero-point shifted, this FSK demodulating device can always demodulate frequency shift keying signal b to accurate digital data signal h.

As shown in FIG. 6, time constant circuit 15 can be constituted by a series circuit including resistor 15a and capacitor 15b. Therefore, by adding time constant circuit 15 to the conventional demodulator, manufacturing cost for the FSK demodurating device cannot be largely increased. Therefore, a high-performance FSK demodulating device can be obtained at low cost.

What is claimed is:

1. A direct frequency shift keying (FSK) demodulating apparatus in a transmission system for formatting digital data into a transmission frame including at least a preamble data indicating at least a start of data to be transmitted, and data to be transmitted, said preamble including a first signal level having a corresponding duration, and for transmitting the transmission frame as a frequency shift keying signal, said apparatus comprising:

detecting means for detecting the input frequency shift keying signal (FSK) and for converting the detected signal into first and second voltage levels corresponding to first and second carrier frequency values, respectively; and demodulating means coupled to said detecting means for demodulating the voltage levels output from said detecting means to an original digital data signal representing said transmission frame, said demodulating means including:

time constant circuit means, coupled to said detecting means, for exhibiting a time constant characteristic corresponding to said preamble first signal level duration, said time constant characteristic determining a time interval required for increasing a charging voltage to an inputted voltage level, said time constant circuit means for increasing said charging voltage, in response to the voltage level from said detecting means within a period in which the preamble is received, and for discharging the charging voltage in accordance with the time constant characteristic;

reference voltage generating means, coupled to said time constant circuit means, for generating a reference voltage which is a fraction of a predetermined value of an amplitude value of the first signal level, and for generating a difference voltage between the reference voltage and the charging voltage from said time constant circuit means as a comparison reference signal; and comparing means, coupled to said detecting means, said time constant circuit means, and said reference voltage generating means, for comparing the voltage signal level provided by said detecting means with the comparison reference signal generated by said reference voltage generating means to detect the level of the voltage signal level provided by said detecting means.

2. A device according to claim 1, wherein said reference voltage generating means includes means for generating a reference voltage which is half of a predetermined value of said amplitude value of the first signal level.

3. In a receiving system of the type for receiving a direct FSK modulated carrier signal, said carrier signal modulated by a digital data signal including an initial preamble start bit having a first logic level followed by at least one further bit of digital data, said modulated carrier signal having a first frequency when modulated by a bit having said first logic level and having a second, different frequency when modulated by a bit having a second logic level different from said first logic level, apparatus for reliably detecting and demodulating said direct FSK modulated carrier signal despite frequency shifting occurring in both said first and second frequencies, said apparatus comprising:

detecting means, connected to receive said FSK modulated carrier signal and having an output terminal, for applying an output voltage level responsive to the frequency of said carrier signal to said output terminal;

time constant means connected to said detecting means output terminal for acquiring said first output voltage level when said received carrier signal modulated by said initial preamble start bit is received during a first time period $T_O$ and for substantially retaining said acquired first output voltage level during a further time period $T_D$ subsequent to said first time period $T_O$, said received carrier signal being modulated by said following data bit(s) during said further time period $T_D$;

reference voltage means connected to said time constant means for generating a reference voltage level and for combining said generated reference voltage level with said acquired first output voltage level to provide a reference voltage level $V_R$; and comparing means having first and second input terminals and an output terminal, said comparing means first input terminal coupled to said detecting means output, said comparing means second input terminal connected to receive said reference voltage level $V_R$, said comparing means for outputting a first level at said output terminal whenever the voltage level at said detecting means output exceeds said voltage level $V_R$ and for providing a second level different from said first level at said output terminal whenever the voltage level at said detecting means output is less than said voltage level $V_R$.

4. In a receiving system of the type for receiving a direct FSK modulated carrier signal, said carrier signal modulated by a digital data signal including an initial preamble start bit having a first logic level followed by at least one further bit of digital data, said modulated carrier signal having a first frequency when modulated by a bit having said first logic level and having a second, different frequency when modulated by a bit having a second logic level different from said first logic level, a method for reliably detecting and demodulating said direct FSK modulated carrier signal despite frequency shifting occurring in both said first and second frequencies, said method comprising the following steps:

(a) receiving said FSK modulated carrier signal modulated by said initial preamble start bit during a first time period $T_O$;

(b) concurrently with said receiving step (a), detecting said received FSK modulated carrier signal, including producing an output voltage level responsive to the frequency of said FSK modulated carrier signal;

(c) acquiring said first output voltage level produced by said detecting step (b);

(d) substantially retaining said acquired first output voltage level during a further time period $T_D$ subsequent to said first time period $T_O$;

(e) receiving said FSK modulated carrier signal modulated by said following data bit(s) during said further time period $T_D$;

(f) concurrently with said receiving step (e), detecting said received FSK modulated carrier signal, including producing an output voltage level responsive to the frequency of said FSK modulated carrier signal;

(g) generating a reference voltage level;

(h) combining said generated reference voltage level with said acquired first output voltage level to provide a further reference voltage level $V_R$;

(i) comparing said generated reference voltage level $V_R$ with said output voltage level produced by said detecting step (f);

(j) outputting a first level at an output terminal whenever said comparing step (i) reveals the voltage level produced by said detecting step (f) exceeds said voltage level $V_R$; and (k) outputting a second level different from said first level at said output terminal whenever said comparing step (i) reveals the voltage level produced by said detecting step (f) is less than said voltage level $V_R$.

* * * * *